Aug. 18, 1970     EIZO GOTO     3,524,918

ELECTRICALLY-HEATED GLASS-MELTING APPARATUS

Filed Aug. 29, 1968     3 Sheets-Sheet 1

EIZO GOTO,
*INVENTOR.*

BY *Stephen H. Frishauf*

United States Patent Office 3,524,918
Patented Aug. 18, 1970

3,524,918
ELECTRICALLY-HEATED GLASS-MELTING APPARATUS
Eizo Goto, Chigasaki-shi, Japan, assignor to Tokyo Shibaura Electric Co., Ltd., Kawasaki-shi, Japan, a corporation of Japan
Filed Aug. 29, 1968, Ser. No. 756,226
Claims priority, application Japan, Sept. 4, 1967, 42/56,527; Jan. 10, 1968, 43/882; July 5, 1968, 43/46,525
Int. Cl. C03b 5/02
U.S. Cl. 13—6
11 Claims

ABSTRACT OF THE DISCLOSURE

Electrically-heated glass-melting apparatus comprising a bath to accommodate molten glass therein, a pair of electrodes disposed at the opposite inner sides of the bath to concentrate passage of electric current at the surface region of the molten glass, a cooling means provided at said bath bottom to cool the lower layer of the glass, and a power supplying means connected across said electrodes.

---

The present invention relates to an electrically-heated glass-melting apparatus adapted to dip a workpiece in molten glass for seal, weld or formation of a glass film thereon.

Hitherto there have been known a variety of processes using molten glass such as those which consist in dipping articles to be bonded, for example, those made of glass, metal or ceramics in molten glass having the same or approximately the same thermal expansion coefficient as that of these articles to bond them by forming a glass layer on the surfaces of their jointed parts or those which consist in dipping an annular body in molten glass to form a glass film thereon.

There have been employed a number of heating methods, for example, the one using burner flames in thermally melting to a prescribed viscosity the glass material to be provided for the above-mentioned applications. However, the burner flame method in particular is not suited for producing molten glass having a desired viscosity, because relatively low melting ingredients of a crucible or impurities from burner flames easily dissolve into and contaminate the molten glass. There are further drawbacks that since the entire molten glass was finally formed into a fluid having almost the same viscosity, it is very difficult to obtain an optimum viscosity distribution for the molten glass, namely, the distribution wherein the glass viscosity gradually decreased toward the surface and increased toward the bottom of the glass bath. Consequently when these articles were taken out of the molten glass after its deposition, the molten glass deposited on the surface thereof was not easily separated from the remainder of the molten glass, with the resultant failure to effect good seal.

The present invention has been developed with the view of maintaining a good distribution of electric current flowing across both electrodes of an electrically-heated glass-melting bath, preventing the damage of electrodes and workpieces and providing a most suitable viscosity distribution of molten glass for the seal or weld of workpieces or formation of a glass film thereon. More specifically, the invention is intended to provide an electrically-heated glass-melting apparatus comprising a pair of electrodes disposed in an opposite relation either in the vicinity of the open end of the bath, or in such a manner that the electrode planes facing each other are spaced progressively wider along lines extending from the surface to the bottom of the molten glass in the furnace, a cooling means provided at the bath bottom to cool the molten glass, and, if required, an automatic current control device positioned between the electrodes and a separately provided power source.

The present invention can be more fully understood from the following description taken in conjunction with reference to the appended drawings, in which.

Figure 1:
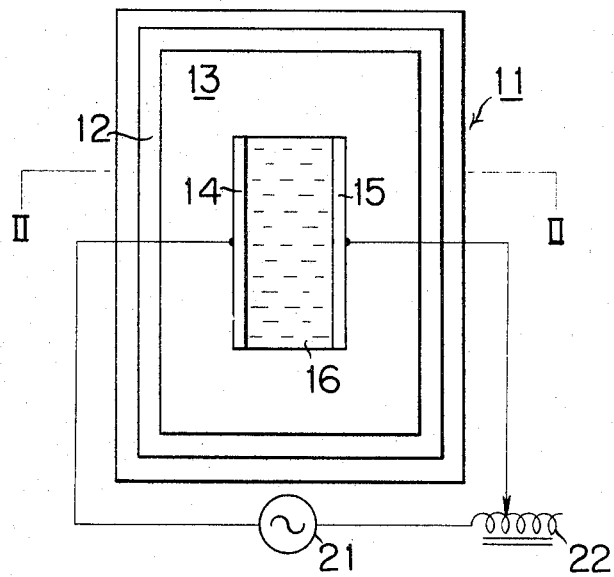
FIG. 1 is a plan view of an electrically-heated glass-melting apparatus including an electrical circuit according to an embodiment of the present invention.

Noticing that when a workpiece is dipped in molten glass for seal or weld or formation of a glass film thereon it is required to provide an optimum viscosity distribution for the molten glass contained in a furnace, the inventor has succeeded in preserving a most favorable viscosity distribution of molten glass over a long period of time by arranging a pair of electrodes for thermally melting glass on the inner furnace walls in such a manner that the interelectrode space is most reduced at the upper part of the furnace, allowing large amounts of electric current to flow through the surface area of a bath of molten glass so as to render the molten glass of that portion least viscous and providing a cooling device at the furnace bottom to cool the molten glass nearby.

The inventor has found that since the low viscosity portions of molten glass usually used in the dip seal are obtained by heating to a temperature of more than 1,000° C., the parts of the electrodes coming in contact therewith are worn out due to excess heating in a relatively short time or oxides of the electrode material are melted into the molten glass to degrade the glass quality, and based on this knowledge, has succeeded in obtaining an optimum viscosity distribution of molten glass by cooling the electrode starting from the bottom thereof in order to avoid such excess heating and preventing the deterioration of quality of the molten glass and the depletion of the electrode to prolong its life.

When a workpiece is initially dipped in molten glass, it is generally preferred to raise the voltage of a power source for the electrical melting of glass so as to supply large amounts of electrical current in a short time to heat upper glass portion, automatically reduce the voltage when the resistance decreases with increasing temperature, thereby to set the electrical current running through the furnace at a prescribed value. However, such operation is extremely difficult and, as already experienced, the electrodes or workpieces are often damaged due to the flow of excess electrical current.

The inventor has succeeded in preventing the electrodes or workpieces from being damaged by providing an automatic current control device between the heating electrodes and a power source and thereby supplying a constant current to the molten glass independently of variations in the interelectrode resistance. Namely, it has been found that when a workpiece is initially dipped in molten glass, the surface portion of the glass in which the workpiece is dipped is temporarily cooled to increase the electrical resistance of that area so that the electrical current bypasses the surface of the molten glass and runs through the intermediate phase thereof which has a relatively lower resistance than the surface portion, though it originally has an appreciably high resistance. Thus there is released a great deal of heat due to resistance loss. As the melting of glass proceeds with heating, the electrical current is directed to the surface area whose electrical resistance has now been much reduced. This substantially decreases the amounts of heat generated by resistance loss, so that there is no possibility of a workpiece being damaged by excess heating.

Figure 2:
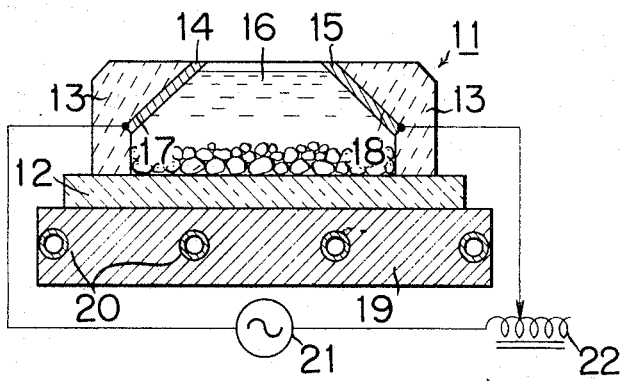
FIG. 2 is a sectional view on line II—II of FIG. 1.

There will now be described the present invention by reference to the illustrated embodiments. As shown in FIGS. 1 and 2, a melting furnace 11 is fabricated into a substantially rectangular form and consists of a relatively thin furnace stand 12 made of refractory material including layers of refractory bricks superposed thereon and a frame member 13 in which there are arranged a pair of electrodes 14 and 15 in an opposite relation at the upper part of the mutually facing inner furnace walls. There is defined a void space by the furnace stand 12 and frame member 13 so as to receive molten glass 16. To describe further, the opposite inwardly inclined inner side walls 17 and 18 of the frame member 13 form a tapered space as viewed crosswise in such a manner that as shown in FIG. 2, the area between the inwardly inclined inner side walls 17 and 18 is most reduced at the open end of the frame member 13 and is downwardly broadened toward the middle point of each side wall. The electrode plates 14 and 15 are arranged along the inwardly inclined inner side walls 17 and 18. Further, the melting furnace 11 is mounted on a cooling device, for example, a water-cooled iron plate 19 having water pipes 20 provided therein. Also across the electrode plates 14 and 15 is connected an A.C. source 21 through a stabilizer 22. Thus is constructed the electrically-heated glass-melting apparatus of the present invention.

The furnace 11 of the melting apparatus arranged as described above is fully filled with glass material 16 having the same or approximately the same thermal expansion coefficient as that of a workpiece. When a voltage is impressed across the electrode plates 14 and 15 after the glass material is preheated otherwise than electrically, the glass material between the electrode plates 14 and 15 presents a resistance progressively increasing toward the depth. Accordingly the molten glass in the furnace has a current distribution, the density of which gradually decreases from the surface to the depth of the glass bath, so that the viscosity of molten glass particularly near the surface of the bath is noticeably reduced.

The angle defined by the electrode plates 14 and 15 with the surface plane of the molten glass 16 may be suitably selected within the range of from 120° to 160° according to the interelectrode space and the composition of the molten glass 16. As this angle broadens, the current density relative to the depth of the molten glass 16 remarkably varies. If the mutually facing electrode plates 14 and 15 are so positioned as to cause said angle to be excessively enlarged, an electrical current will flow concentratedly on the part closest to the interelectrode space, severely consuming the electrode material in this area. Where the electrode is made of, for example, molybdenum, there will be generated a brown product due to a reaction between the molybdenum and glass with the disadvantage of deteriorating the glass quality.

Figure 3:
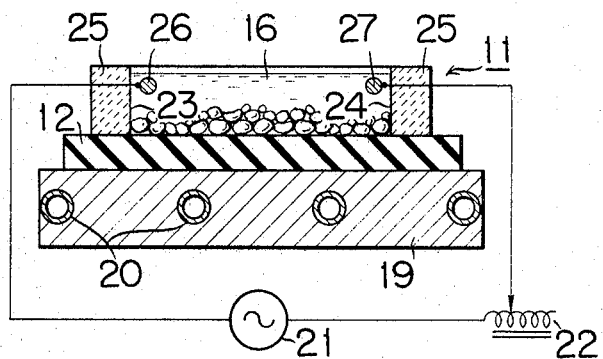
FIG. 3 is a sectional view taken in a similar way to that of FIG. 2 of a modified electrically-heated glass-melting apparatus including an electrical circuit according to the present invention.

In contrast to FIG. 2, the embodiment shown in FIG. 3 comprises frame member 25 having a pair of vertical inner walls 23, 24 and a pair of electrode rods 26, 27 being immersed at the vicinity of the molten glass 16, with other constructions being substantially the same as those of FIG. 2. The same advantages as that of FIG. 3 can be obtained even with this embodiment excepting the durability of electrodes. When the electrode plates are so arranged as to define an angle of the aforementioned range with the surface plane of the molten glass bath, the consumption of electrode material will be reduced to one-third or less of that which is encountered with a pair of electrode rods horizontally laid end to end with a little space allowed therebetween.

When the glass material 16 is thermally melted simply by impressing an A.C. voltage across a pair of electrode plates 14 and 15 or 26 and 27, the deeper or bottom part of the glass material 16 will also gradually rise in temperature, allowing large amounts of electric current to flow therethrough with the resultant reduction of viscosity of the molten glass 16 in this area. According to the present invention, however, cooling water is caused, as described above, to run through the water pipes 20 of the water-cooled iron plate 19 on which is mounted the melting furnace 11. Since the molten glass 16 is cooled by the water-cooled iron plate 19 through the relatively thin walls of the furnace body 12, the molten glass 16 at the bottom of the bath will be more cooled than at other parts, causing the molten glass in this area to have a rather high viscosity amounting to, for example, scores of poises. Accordingly the electrical current supplied across the electrode plates 14 and 15 or 26 and 27 finds difficulty in flowing through the bottom part of the glass bath and is concentrated on the surface area, reducing the viscosity of the molten glass there due to its effective melting. If an electrical current continues to be introduced under the aforementioned condition of the bath, the viscosity of the molten glass 16 at the upper part thereof will be reduced to only several poises, a level most suitable for the dip seal, or weld, thus permitting the molten glass deposited on a workpiece to be easily separated from the remainder of the molten glass.

Figure 4:
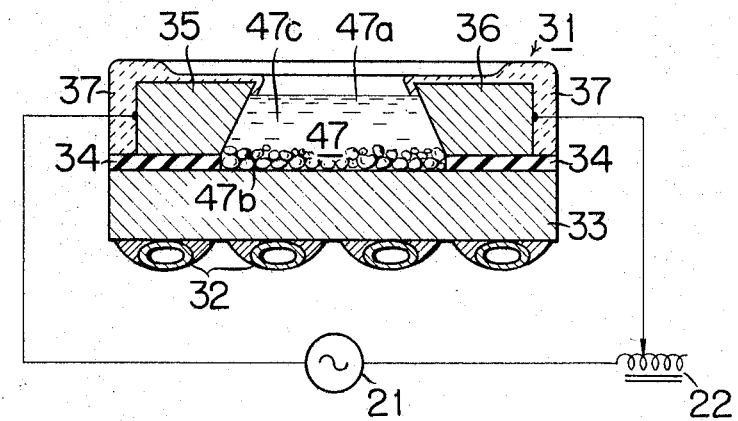
FIG. 4 is a cross sectional diagram of an electrically-heated glass-melting apparatus including an electrical circuit according to another embodiment of the invention.

FIG. 4 is a concrete representation of a cooling device for heating electrodes. Namely, the melting furnace 31 comprises cooling jackets 32 through which is circulated water or other cooling media, a furnace stand 33 made of metal such as iron, or copper which is mounted on said cooling jackets 32 and a pair of electrodes 35 and 36 which are disposed on the furnace stand 33 with an insulation sheet 34 of glass or the like lying therebetween.

The electrodes 35 and 36 consist of, for example, molybdenum, and are spaced from each other as in the embodiment of FIG. 1. The upper end of each electrode projects slantwise in such a manner that the interelectrode space is most reduced at the upper part of the furnace 31. However, unlike FIG. 1, the embodiment of FIG. 3 comprises rather thick-walled electrodes 34 and 35. The bottom of each electrode has a broad area and is brought through a thin insulation plate 34 into contact with a cooling device consisting of the furnace stand 33 and cooling jackets 32 so as to elevate the effect of cooling the electrodes 35 and 36. Reference numeral 37 represents an insulation shield covering the electrodes 35 and 36, which is formed of, for example, chamotte bricks. Also across the electrodes 35 and 36 is connected an A.C. source 21 through a stabilizer 22.

Figure 5:
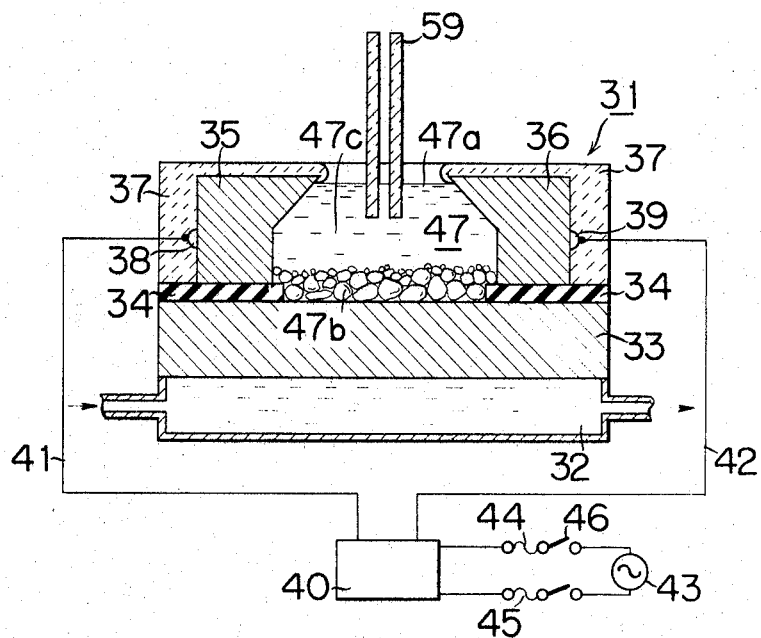
FIG. 5 is a cross sectional diagram of an electrically-heated glass-melting apparatus including an electrical circuit according to another embodiment of the invention.

FIG. 5 is another representation of a cooling device for heating electrodes and an automatic current control device provided between the electrodes and power source as used in the present invention. The reference numerals employed in FIG. 5 are intended to represent the same significance as those in FIG. 4. In this representation, the electrodes 35 and 36 are respectively connected at contacts 38 and 39 to an automatic current control device 40 by conductors 41 and 42 and then to a power source 43 through fuses 44, 45 and switches 46.

The furnace 31 is charged with glass material having the same or approximately the same thermal expansion coefficient as that of a workpiece. The glass material is preheated to a temperature of 700° to 800°, for example, by a burner (not shown). When a voltage is impressed across the electrodes 35 and 36 in the meantime, an electric current runs through the charged glass material rapidly to melt it into molten glass 47. As in the embodiments of FIGS. 1 and 2, the molten glass 47 presents as low a viscosity as several poises at the surface area 47a, but an increasing viscosity toward the furnace bottom 47b where the glass remains almost solidified. Further, the electrodes 35 and 36 are effectively cooled from below through the insulation plate 34 so that their excess heating is prevented. Experiments show that with a melting furnace which was not provided with a cooling device at the bottom, the quality of the molten glass was so much deteriorated during 12 hours of power conduction as to make the subsequent operation impossible. In contradistinction to this, the embodiment of FIG. 3 permitted a continuous run for more than 30 hours without any difficulties.

Figure 6:
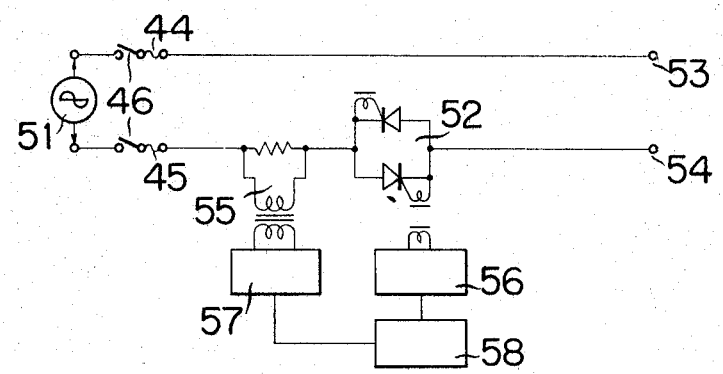
FIG. 6 is a block diagram of an electrical circuit used in the invention.

There will now be described an embodiment of the automatic current control device 51 used in the present invention by reference to FIG. 6. This automatic current control device comprises a phase control circuit 52 disposed by reverse parallel connection between the A.C. source 51 and electrodes 53 and 54 and consisting of rectifier elements each provided with a pair silicon controlled electrodes, a current detecting circuit 55 serially connected to the phase control circuit 52, a gate signal generating circuit 56 for the phase control circuit 52, a phase shifting circuit 58 for controlling the phase of the gate signals, and a feedback circuit 57 for controlling the phase shifting circuit with detecting outputs from the current detecting circuit 55. To describe further, the gate signal generating circuit 56 comprises a relaxation oscillator consisting of a unijunction transistor and condenser. The phase shifting circuit 58 is intended to change the time constant of a time constant circuit including the condenser of the relaxation oscillator, and is formed of a transistor disposed in a charging circuit for the aforesaid condenser and a variable resistor for regulating the base current thereof. The feedback circuit 57 is composed of a rectifier circuit for rectifying detecting outputs from the current detecting circuit, a smoothing circuit for smoothing out rectifying outputs from the recifier circuit and a transistor so connected as to cause its base circuit to be controlled by a direct current obtained by the aforesaid smoothing operation and also to control the transistor of the phase shifting circuit.

There will now be described a constant voltage controlling operation. Let it be assumed that a load current flowing through the phase control circuit 52 is increased. Then such increase is detected by the current detecting circuit 55 to increase the amounts of signals to be fed back through the feedback circuit 57. The increased amounts of feedback controls the phase shifting circuit 58 so as to delay the phase of gate signals issued from the gate signal generating circuit 56. As a result, the conducting phase angle is reduced and the effective value of the load current becomes equal to the standard value prior to said reduction. Also where the load current is reduced, the conducting phase angle is conversely broadened, and the effective value of said load current also becomes equal to the standard value. Moreover, since responses are made at an extremely rapid rate, the load current is actually kept constant. The adjustment of the standard value can be easily carried out by operating the variable resistor of the phase shifting circuit. In the embodiment of FIG. 5 the phase control circuit comprises rectifier elements each provided with silicon controlled electrodes. It will be apparent, however, that use of bilateral semiconductor controlled rectifier elements in place of the aforesaid rectifier elements will bring about the same effect. Further to meet variations in room temperature, thermistors may be incorporated in the subject current control device.

The electrically-heated glass-melting apparatus of the present invention always produces a constant current by means of a source of constant current using an automatic current control device 40 of the aforementioned arrangement. Accordingly, there is no danger of a workpiece being damaged due to excess heating. Following is the reason. When the workpiece 59 is initially dipped in molten glass the part of the glass bath where the workpiece 59 is dipped is cooled thereby to increase the resistance of the bath, so that the electrical current bypasses the surface area of the bath and flows through the intermediate phase 47c thereof which has a relatively higher resistance than the surface area, though it originally has an appreciably high resistance. As a result, there are released large amounts of electric power. As the melting of glass proceeds with heating, the electrical current begins to run through the surface area 47a of the bath whose resistance has now been much reduced, decreasing the evolution of heat due to resistance loss. Namely, the present invention enables a constant current to be supplied to the molten glass regardless of variations in the interelectrode resistance by the use of the aforementioned automatic current control device 40. Preferable for use in the present invention is the glass material whose electrical resistance remarkably varies at operating temperatures of from 700° to 1,200° C.

As mentioned above, the electrically-heated glass-melting apparatus according to the present invention is fabricated by arranging a pair of mutually facing heating electrode plates at the upper part of the melting furnace in such a manner that the interelectrode space is most reduced at the open end thereof, and providing a cooling device at the furnace bottom to cool the lower portion of the molten glass and electrodes. With the present glass-melting apparatus, therefore, the molten glass is allowed a suitable viscosity distribution and the electrodes are prevented from being damaged due to excess heating. Since articles to be joined are dipped in the molten glass of very low viscosity in the surface area of the bath, the glass deposit on the joint of the articles can upon their removal from the bath be easily separated from the remainder of the molten glass, so that there can be formed a plain glass film of suitable thickness on said joint. Elimination of the excess heating of electrodes as described above prevents their depletion and the possible contamination of molten glass with impurities, for example, released particles of oxides of electrode material. Further, the provision of an automatic current control device between the electrodes and power source assures a constant viscosity for the molten glass and prevents the electrodes and workpieces from being damaged due to the flow of excess electrical current.

What is claimed is:

1. An electrically-heated glass-melting apparatus comprising:
    a bath to accommodate molten glass;
    a pair of opposed electrodes disposed within said bath with their opposed faces inclined such that the distance between them is smallest at their upper ends, and said distance increases towards their lower ends, said electrodes extending to the zone in which the surface of the molten glass is intended to be formed;
    means for supplying power across said electrodes; and
    cooling means for cooling the molten glass at the bottom of the bath.

2. An electrically-heated glass-melting apparatus according to claim 1, wherein said electrodes are each in the form of a plate, and wherein said distance gradually increases towards the lower ends of said plates.

3. An electrically-heated glass-melting apparatus according to claim 1, wherein said bath is provided with a metal plate on the bottom thereof, and said cooling means being in contact with said bottom.

4. An electrically-heated glass-melting apparatus according to claim 3, wherein said cooling means is integrated with said bottom.

5. An electrically-heated glass-melting apparatus according to claim 1, wherein said cooling means comprises a plurality of cooling jackets through which liquid flows.

6. An electrically-heated glass-melting apparatus according to claim 1, comprising:
   a metal plate on the bottom of said bath with which said cooling means is in contact;
   said electrodes being shaped so that the distance between their opposing faces is smallest at their top ends, and is constant at their bottom ends; and
   an electrically insulating layer thermally connecting the bottoms of said electrodes to the metal plate.

7. An electrically-heated glass-melting apparatus according to claim 6, wherein the surface of said electrode exposed to the outside of the molten glass is coated with a refractory material.

8. An electrically-heated glass-melting apparatus according to claim 6, wherein said electrically insulating layer is a glass sheet.

9. An electrically-heated glass-melting apparatus according to claim 1 comprising a constant current control device disposed between the electrodes and power supplying means.

10. An electrically-heated glass-melting apparatus according to claim 9 wherein said constant current control device comprises a phase control circuit interposed between said power-supplying means and said electrodes, a current detecting circuit serially connected to said phase control circuit, a gate signal generating circuit for said phase control circuit, a phase shifting circuit for controlling the phase of gate signals and a feedback circuit for controlling the phase shifting circuit with outputs from the current detecting circuit.

11. An electrically-heated glass-melting apparatus according to claim 10 wherein said phase control circuit consists of semiconductor controlled rectifier elements.

References Cited

UNITED STATES PATENTS

| | | | |
|---|---|---|---|
| 2,119,949 | 6/1938 | Blau et al. | 65—347 X |
| 2,267,537 | 12/1941 | Romazzotti | 13—6 |

BERNARD A. GILHEANY, Primary Examiner

R. N. ENVALL, Jr., Assistant Examiner

U.S. Cl. X.R.

65—347